United States Patent [19]
Cooper

[11] 3,815,236
[45] June 11, 1974

[54] DENTAL RESTORATION JIG

[76] Inventor: Abraham J. Cooper, 1362 Gipson St., Far Rockaway, Queens, N.Y. 11691

[22] Filed: July 16, 1973

[21] Appl. No.: 379,748

[52] U.S. Cl. .................................................. 32/11
[51] Int. Cl. ............................................ A61c 13/00
[58] Field of Search ............................. 32/11, 40 R

[56] References Cited
UNITED STATES PATENTS
3,552,018  1/1971  Zahn ...................................... 32/11
3,650,032  3/1972  Kestler .................................. 32/11

*Primary Examiner*—Robert Peshock
*Attorney, Agent, or Firm*—Albert F. Kronman, Esq.

[57] ABSTRACT

A dental restoration jig having a base to receive a plurality of cylindrical bands containing impressions of individual teeth, and a flanged dowel table for positioning and securing dowel holders, said table being slidably received in the base. The base and table permit the accurate setting of dowels into the dental impressions during casting of a tooth model so that subsequent alignment of teeth in a restoration is made easier and more accurate.

6 Claims, 4 Drawing Figures

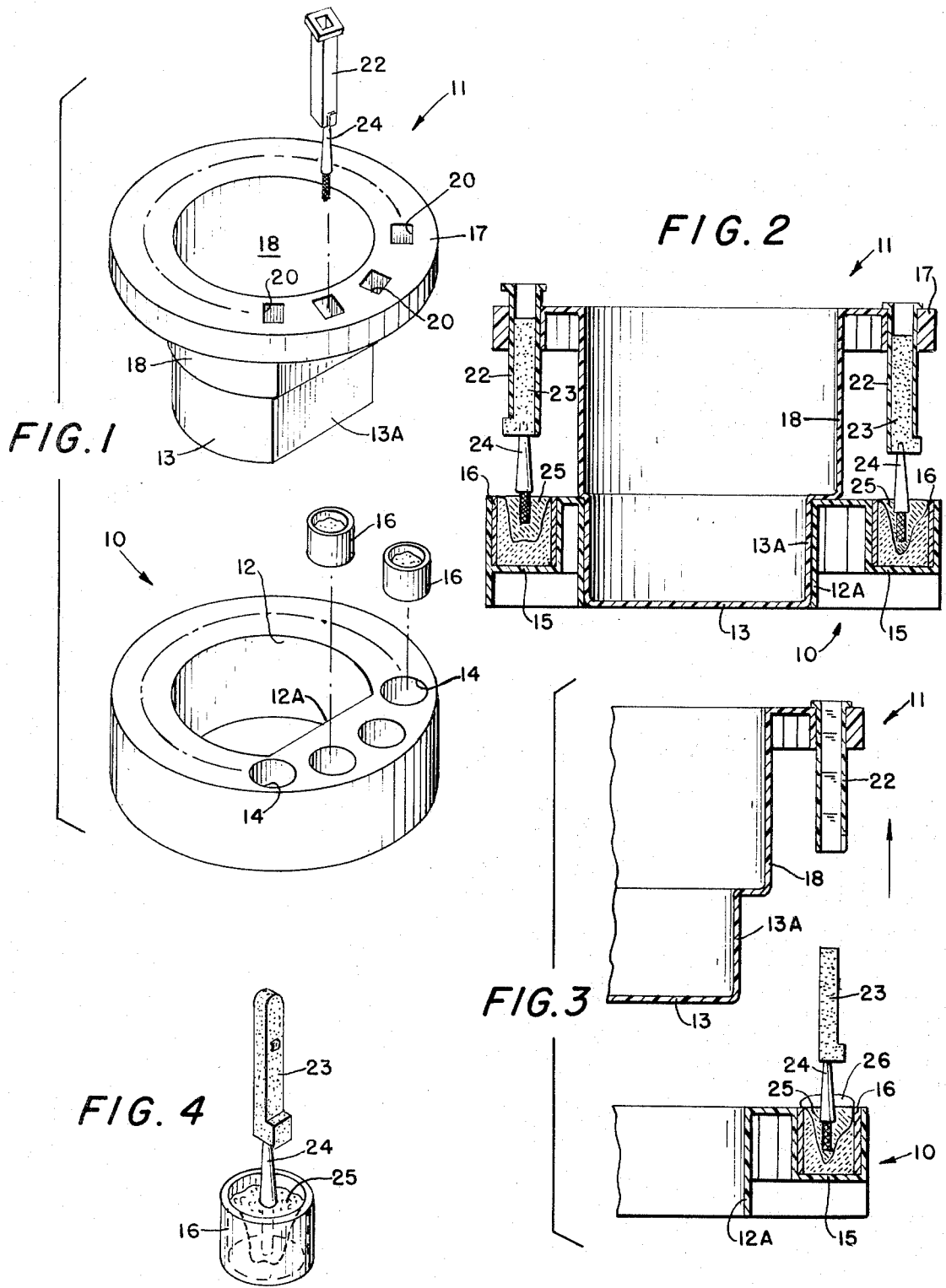

DENTAL RESTORATION JIG

BACKGROUND OF THE INVENTION

In the manufacture of dental restorations, the general procedure includes the making of a wax or rubber impression of the patient's teeth and gums. A die is then made by pouring cast stone or plastic into the cavities of the impression to form a casting of the teeth and gums, known as a model or mold. The wax impression is then peeled away from the model and dies and this model is used by the dental technician or the dentist in constructing the desired restoration. During the construction of the restoration, it is often necessary to remove individual tooth dies to work around closely spaced teeth reproduced in the model. The problem of accurately replacing such dies in their original orientation is important and various devices have been employed in the past to solve this problem but the results have not been entirely satisfactory.

The present invention used a dowel pin for each tooth to be added to a restoration. The dowels are carried in a flanged table received within a base having a vertically aligned non-circular reference hole. The vertical alignment insures a better positioning of the tooth in the restoration and it also adds to the flexibility afforded to the technician as the final assembly is made.

A feature of the invention is the two part jig, comprising a table member, a base and having a plurality of spaced bores for positioning tooth impressions in the base portion, and spaced openings in the removable table above the bores for securing and orienting dowels.

Another feature of the invention is the provision of a readily removable table portion for easy access and adjustment of individual dowels and impressions.

A further feature of the present invention is its non-circular interconnection between the table and base which insures orientation of the dowels and impressions.

SUMMARY

The dental restoration jig, according to the present invention, includes a ring-shaped base portion formed with a plurality of spaced cylindrical bores arranged in a circular array. The central part of the base is open and receives therein the hollow body portion of a table member. The table which is removable, includes an outwardly extending flange having a plurality of spaced square openings arranged in vertical alignment with the bores in the base. The hollow body portion of the table is non-circular and conforms to the shape of the opening in the base portion. When the table and base are joined, the square openings in the flange are in alignment with the bores in the base. A plurality of dowel holders are fitted into the square openings and are filled with a soft plastic insert for holding the dowels.

Additional details of the invention will be disclosed in the following description, taken in connection with the accompanying drawings.

BRIEF DESCRIPTION OF THE FIGURES

FIG. 1 is an exploded perspective view showing the base portion, the removable table portion, dowels, dowel holders, and two tubular die holders.

FIG. 2 is a cross sectional view of the restoration jig when the portions are joined and when the dowels are moved into the tooth dies.

FIG. 3 is a partial cross sectional view of the restoration jig shown in FIG. 2 after a dowel has been cast in a tooth die and the dowel holder case removed from the plastic core insert.

FIG. 4 is a perspective view of a tube die holder, its tooth die, a dowel, and the soft plastic dowel holder insert secured to the dowel.

DESCRIPTION OF THE PREFERRED EMBODIMENT

Referring now to the Figures, the restoration jig includes a base 10, and a removable table 11. The base 10 is generally ring-shaped with a non-circular axial opening 12, which may be somewhat D-shaped in cross section as shown in FIG. 1. The non-circular opening assures that the base and table will always be assembled in the same position. The base 10 is formed with a plurality of circular bores 14, equally spaced as indicated. The bores 14, as shown in FIGS. 2 and 3, are formed with a bottom 15 so that a tubular member such as a copper band or shell 16, used for taking impressions of teeth, will fit in the bore and have its upper edge level with the surface of the base. The bands 16 are centered within the bores 14 by means of shims or other suitable material such as clay (not shown).

The upper or table portion 11 of the jig includes a flange 17, and a supporting body 18, having a base mating extension 13. Extension 13 is formed with a flat section 13A which cooperates with a similar flat section 12A of the base 10 to insure that the upper and lower portions of the jig will always be joined in the same orientation. Other non-circular mating configurations can be used, all that is necessary is the provision of a snug fit between the parts with cooperating shapes which always mate in the same relative position.

The flange 17 on the table 11 of the jig is formed with a plurality of spaced square or oblong openings 20 which are aligned with the bores 14 when the table and base portions are joined. The openings 20 receive therein square or oblong elongated dowel holders 22, each having a removable soft plastic core 23. The core material 23 can be neoprene, silicone rubber, or the like, with considerable resilience and capable of holding a small dowel 24 by its upper end while the lower end of the dowel is forced into a semi-solid casting material 25 in the tooth impression, shells or bands. The lower end of the dowel 24 is knurled, as shown, to improve its holding ability within the casting material 25.

The operation of this jig assembly is as follows: The dentist fills the copper band or shell 16 with wax and makes an impression of each of the patient's teeth which are to be restored in the usual manner. The the copper bands or shells 16 are placed in the bores 14 of the base portion 10 of the jig and centered therein. A dowel holder 22 is placed in each of the openings 20 in the table. A dowel 24 is then slipped into the cores 23 of the dowel holders 22. The dowels 24 and the table are next fitted to the base whereupon the dowels are in line with the lower bores holding the tooth impressions. A number of dowels and impressions can be aligned at the same time. Each dowel is lowered into its corresponding impression (See FIG. 2) by an amount judged to be sufficient by the dentist depending upon the size and shape of the tooth. The table 10 with the dowel holders and dowels is then removed while a casting material 25 such as cast stone, epoxy, or the like is poured into the impressions. At this juncture the base 10 may be centrifuged or vibrated to force the casting material into good contact with the surfaces of the impressions. The table portion is then replaced, pushing the lower ends of the dowels into the casting material. During this operation, the entire jig may again be vibrated by placing it on a vibrating table (not shown) in order to insure that the casting material enters all the recesses in the tooth impression.

After the stone or other cast material 25 has hardened around the dowels 24, a lubricant 26, such as oil, petroleum jelly, or light grease is spread over the surface of the cast material 25. The table 11 is removed from the base as shown in FIG. 3 leaving the cores 23 on the dowels. The copper tubes 16 are now pulled away from the teeth impressions and most of the wax removed from the hardened cast material 25. The cores 23 can now be removed from the dowels 22 and the complete restoration work continued.

A wax impression of the patient's mouth is made at the same time the casting material 25 is poured into the tooth impressions. In this impression, each of the patient's teeth provides a cavity which is a negative replica of the cast tooth impressions 25 made by the process described above. The master impression of the patient's mouth is now preferably plated (silver or copper) to provide a thin lining of metal. The teeth impressions 25, along with their dowels, may now be fitted into the negative replica indentations and oil or grease applied to all exposed surfaces. Next, an additional quantity of stone or epoxy is poured over the master wax impression to produce a model assembly. This model acts as a form or support upon which the dental restoration is built. The model corresponds to the teeth and gums of the patient in every way with respect to the shape and angular disposition of the pateint's teeth. There is one big difference however. The resulting model, made as described above, includes detachable teeth which can be removed from the model and replaced many times, if necessary, to aid in fashioning the restoration. A similar negative impression of a patient's mouth is shown in U.S. Pat. No. 3,286,350, issued to A. J. Cooper, on Nov. 22, 1966. This patent also indicates the manner in which a complete dental restoration can be made.

The final model is preferably made with the ends of the dowels protruding a short distance from the bottom of the casting or into a transverse bore therein. Since a coating of grease was spread over the tooth and the dowels, they can be removed by a gentle blow applied to the exposed end of the dowels, or lifted out using a small flat instrument.

In securing the dental impressions to the base, a thin band of some suitable material (not shown) may be slipped between the wall of the bore 14 and the impression shell. The band is preferably transparent such as a transparent plastic and extends above the base. The casting material can be cast above the surface of the base and the dowel pin adjusted to the proper depth by observing it through the plastic band. Once adjusted, the table may be removed and thereafter replaced with all the dowels remaining at their proper adjusted depth.

Having thus fully described the invention, what is claimed as new and desired to be secured by Letters Patent of the United States is:

1. A dental restoration jig comprising a ring-shaped base having a central non-circular opening therein, a plurality of vertically disposed spaced bores in the base, a table member having a body portion receivable within the base opening and an outwardly extending flange, said flange having a plurality of spaced openings therein in alignment with the base bores when the table is coupled to the base, a plurality of holders slidably received within the flange openings, a dowel carried by each holder and extending into each of the base bores, said bores being adapted to receive dental impressions therein and a quantity of casting material for said impressions.

2. A jig according to claim 1 wherein the central opening in the base portion is "D" shaped in cross section.

3. A jig according to claim 1 wherein the table body is provided with a depending extension having a cross-sectional shape to mate with the central opening of the base.

4. A jig according to claim 1 wherein the bores in the base are cylindrical and the flange openings are rectangular.

5. A jig according to claim 4 wherein the holders are in the form of elongated rectangles and the dowels are carried by a resilient member within the holders.

6. A jig according to claim 5 wherein the holders are hollow and said resilient members comprise a core receivable within the holders.

* * * * *